United States Patent
Filmer et al.

(10) Patent No.: US 11,203,044 B2
(45) Date of Patent: Dec. 21, 2021

(54) BENEFICIATION OF VALUES FROM ORES WITH A HEAP LEACH PROCESS

(71) Applicant: Anglo American Services (UK) Ltd, London (GB)

(72) Inventors: Anthony Owen Filmer, Kangaroo Point (AU); Daniel John Alexander, St. Albans (GB)

(73) Assignee: ANGLO AMERICAN SERVICES (UK) LTD., London (GB)

( * ) Notice: Subject to any disclaimer, the term of this patent is extended or adjusted under 35 U.S.C. 154(b) by 200 days.

(21) Appl. No.: 15/980,462

(22) Filed: May 15, 2018

(65) Prior Publication Data

US 2018/0369869 A1    Dec. 27, 2018

Related U.S. Application Data

(63) Continuation-in-part of application No. 15/631,137, filed on Jun. 23, 2017, now Pat. No. 9,968,945.

(51) Int. Cl.
*B03B 7/00* (2006.01)
*B03D 1/02* (2006.01)
(Continued)

(52) U.S. Cl.
CPC .............. *B07B 15/00* (2013.01); *B02C 23/14* (2013.01); *B03D 1/02* (2013.01); *B03D 1/06* (2013.01);
(Continued)

(58) Field of Classification Search
CPC ....... B07B 15/00; B07B 2220/00; B07B 7/00; B02C 23/14; C22B 3/04; C22B 1/00;
(Continued)

(56) References Cited

U.S. PATENT DOCUMENTS

| 4,257,882 A | 3/1981 | Mogensen |
| 5,078,860 A | 1/1992 | Ray et al. |

(Continued)

FOREIGN PATENT DOCUMENTS

| CL | 2016002682 A1 * | 2/2017 |
| CN | 102166542 | 8/2011 |

(Continued)

OTHER PUBLICATIONS

International Search Report for Application No. PCT/IB2017/53963, dated Oct. 20, 2017.

*Primary Examiner* — Thomas M Lithgow
(74) *Attorney, Agent, or Firm* — Nixon Peabody LLP; Jeffrey L. Costellia

(57) ABSTRACT

This invention relates to a process for recovering value metals from sulphide ore, including steps of crushing ore in a primary crusher (14) to a size of about 40 cm and less, passing the crushed ore through one or more of the following pre-beneficiation processes such as bulk sorting (16) and screening (20) followed by coarse floatation (46/50), or gravity separation or magnetic separation. A waste stream (54) from the pre-beneficiation process/es with a particle size greater than 100 μm is stacked in a heap (26) and subjected to a heap leach. This integrated process utilises the pre-beneficiation techniques best suited to the characteristics of a particular orebody; and during the pre-beneficiation simultaneously creating a low grade stream that yields significantly higher recoveries than achievable by normal heap leaching of low grade run of mine ore.

14 Claims, 2 Drawing Sheets

(51) Int. Cl.
*C22B 3/04* (2006.01)
*C22B 1/00* (2006.01)
*B07B 15/00* (2006.01)
*B03D 1/06* (2006.01)
*B02C 23/14* (2006.01)
*B07B 13/04* (2006.01)
*C22B 11/00* (2006.01)
*C22B 15/00* (2006.01)
*B02C 23/10* (2006.01)

(52) U.S. Cl.
CPC ................ *B07B 13/04* (2013.01); *C22B 1/00* (2013.01); *C22B 3/04* (2013.01); *C22B 11/00* (2013.01); *C22B 15/0002* (2013.01); *B02C 23/10* (2013.01); *B03B 7/00* (2013.01); *B03D 2203/02* (2013.01); *B07B 2220/00* (2013.01)

(58) Field of Classification Search
CPC ....... C22B 11/00; C22B 15/0002; B03D 1/06; B03D 1/02
USPC .............. 209/39, 17, 18, 12.1, 164
See application file for complete search history.

(56) References Cited

U.S. PATENT DOCUMENTS

| | | | |
|---|---|---|---|
| 5,171,428 A | 12/1992 | Beattie et al. | |
| 5,900,604 A * | 5/1999 | McNeill | B03B 9/00 209/12.1 |
| 6,508,421 B1 * | 1/2003 | Tumilty | B02C 25/00 241/1 |
| 6,945,407 B2 * | 9/2005 | Senior | B03D 1/002 209/164 |
| 8,753,593 B2 | 6/2014 | Senior et al. | |
| 9,028,782 B2 * | 5/2015 | Senior | B03D 1/002 423/138 |
| 9,346,062 B2 * | 5/2016 | Gorain | C22B 34/34 |
| 9,968,945 B1 * | 5/2018 | Filmer | B03D 1/14 |
| 10,758,919 B2 * | 9/2020 | Filmer | B03D 1/08 |
| 2002/0194963 A1 | 12/2002 | Kohr | |
| 2005/0118081 A1 | 6/2005 | Harris et al. | |
| 2010/0199808 A1 | 8/2010 | Kohr | |
| 2011/0155651 A1 * | 6/2011 | Gorain | C22B 34/34 209/162 |
| 2016/0310956 A1 | 10/2016 | Filmer et al. | |
| 2018/0111131 A1 * | 4/2018 | Filmer | B03B 7/00 |

FOREIGN PATENT DOCUMENTS

| | | |
|---|---|---|
| CN | 105755295 | 7/2016 |
| GB | 378063 | 7/1932 |
| WO | WO-2016-170437 | 10/2016 |

\* cited by examiner

BENEFICIATION OF VALUES FROM ORES WITH A HEAP LEACH PROCESS

BACKGROUND TO THE INVENTION

As the grades of available ore have decreased, the benefits of beneficiation prior to fine grinding to fully liberate the valuable mineral components (pre-beneficiation), have become increasingly evident to the mining industry.

Pre-beneficiation methods work on the basis that lower grades of ore can be separated and discarded; or in some cases stored in a low grade stockpile for treatment many years in the future, leaving a higher grade ore in the stream for immediate fine grinding and beneficiation.

The anticipated benefits from pre-beneficiation include the energy savings associated with grinding, and the ability to store the waste in a dry form, thus avoiding problematic tailings formation and associated water loss.

The fall in grade has also affected the industry in other ways, where the capital cost of the large equipment, often located in remote and difficult terrain, also becomes prohibitive to greenfield and brownfield projects.

Again pre-beneficiation techniques hold the promise of removing the low grade fraction of the ore prior to the most capital intensive processes (fine grinding and conventional flotation), and reducing the physical area required for a given level of metal production at the plant.

There are many such pre-beneficiation technologies, only one of which has become standard across the industry. Grade control drilling is routinely used to better assign ore to processing or waste. For some mines such as gold and secondary copper, the grade control process also assigns material to a low grade stockpile for future processing.

The various other pre-beneficiation techniques have been studied extensively but only rarely found commercial application. As a rule of thumb, the unit costs of these operating these pre-beneficiation processes increase as the feed size decreases from rocks to sand, due primarily to the additional comminution and classification required to produce a suitable feed.

The pre-beneficiation options include
- Bulk sorting—a more precise method of grade control based on sensing the grade of blasted rocks after blasting, and better assigning the flow of ore to its appropriate destination
- Screening—using the natural or induced fragmentation to selectively break the rocks along mineralised boundaries, thus enabling a separation on the basis of rock size, and better assigning them to their appropriate destination
- Gravity separation—using differential densities of the constituent mineral fractions, at sizes ranging from rocks to sand, to better assign each density grouping to their appropriate destination. Examples of such devices are DMS, jigs, spirals, classifiers, etc.
- Magnetic separation—using differential magnetic properties, typically at sand type sizes, to better assign the minerals to their appropriate destination
- Coarse flotation—a flotation process which operates at a coarser size than conventional flotation, and separates partially exposed mineralised composites, and better assigns the values to their appropriate destination Despite this variety of potential pre-beneficiation techniques, the industry has only utilised individual technologies for those occasional ores which are naturally amenable to that particular pre-beneficiation technique.

This lack of widespread application is probably due to the grade recovery relationship that is characteristic of all the pre-beneficiation techniques. If the pre-beneficiation technique is designed and operated to yield a high recovery of the valuable component, the proportion of gangue that can be rejected is low. Hence, the benefits that arise from this gangue rejection are insufficient to warrant the cost of the pre-beneficiation.

If the pre-beneficiation technique is designed and operated to yield a high rejection of gangue, the low grade material is not suitable for discard, but must be assigned to a low grade stockpile for later treatment. This is commonly termed as grade engineering. As a consequence, the associated revenue from the values in the low grade stockpile will be many years in the future. Thus, all the costs of mining and pre-beneficiation must be offset against the benefits arising from the fraction of high grade ore progressing to fine grinding.

In summary, the upgrade ratio and yield achieved by the pre-beneficiation techniques is usually insufficient to warrant introduction of the extra materials handling steps, and the delay in ultimate revenue from all the mined ore.

So, instead of extensive pre-beneficiation, a quite different industry paradigm has emerged. The low grade fraction of ore from grade control processes has been stacked in heaps, and directly heap leached. The high grade material from grade control processes is finely ground and beneficiated to produce a high grade concentrate suitable for refining.

This heap leaching has been proposed for recovery of many metals, including nickel, uranium and zinc, but has really found widespread application for gold and secondary and oxidised copper ores.

The leachate is percolated through the heap usually over a period of a few years, and natural airflows provide sufficient oxygen to oxidize and solubilise the mineral of interest. The leachate containing the metal of interest is recovered from the bottom of the heap, and the valuable metal is concentrated and electrowon.

The recovery of the values in this heap leaching process is significantly lower, typically 50-60% vs. 85-90% by fine grinding and flotation; and also much slower, 1-3 years, rather than the few days. But since heap leaching avoids the high capital and operating costs of the intensive crushing, grinding, and beneficiation processes, it is typically economically attractive at grades that are too low to warrant comminution.

However even heap leaching also has limits to its application to low grade ores. The diffusion rates of leachate through partially fractured rocks is an intractable constraint to accelerating the leaching rate and recovery. Whilst finely crushed ores leach more extensively and at a faster rate, the fine crushing introduces extra fine silt that reduces heap permeability offsetting the gains.

Even the fine silt introduced by blasting and materials handling during the heap formation can create areas of low permeability in the heap, hampering the distribution of both the leachate and air, thus also restricting the recovery.

And for primary copper ores, the predominant mineral form of most the worlds copper resources is chalcopyrite. The chalcopyrite passivates during biologically assisted acid leaching, causing low overall extractions. Copper from heap leaching of primary copper orebodies, is utilised purely on an opportunistic basis, with recoveries usually less than around 20%.

Similarly, pgm heap leaching has been proposed, but extractions are typically too low to be of interest.

Most recently however, there are some promising developments in the technology for heap leaching of both chalcopyrite and platinum group metal (pgm) ores. Some of these developments are described in the following publications, the content of which is incorporated herein by reference:

Shaik, et al—"An investigation of the leaching of Pt and Pd from cooperite, sperrylite and column bioleached concentrates in thiocyanate-cyanide systems" Hydrometallurgy 173 (2017) 210-217.

Kraemer, et al—"Improving recoveries of platinum and palladium from oxidized Platinum-Group Element ores of the Great Dyke, Zimbabwe, using the biogenic siderophore Desferrioxamine B" Hydrometallurgy 152 (2015) 169-177.

obertson et al, —"A bacterial heap leaching approach for the treatment of low grade primary copper sulphide ore" The South African Institute of Mining and Metallurgy, The Third African Conference on Base Metals pages 471-484.

Rautenbach, —WO2015/059551

Eksteen, et al, —"A conceptual flowsheet for heap leaching of platinum group metals (PGMs) from a low-grade ore concentrate" Hydrometallurgy 111-112 (2012) 129-135.

Firstly, the heap leach rate of chalcopyrite using the traditional acidic ferric sulphate has been found to increase at elevated temperatures and by maintaining the right oxidation potential in the heap (Robertson).

An acceptable heap leach rate of chalcopyrite has also been identified using an acidic copper chloride heap leaching process operating at low pH. (Rautenbach) This process uses the cupric/cuprous reaction as the oxidant, at an oxidation potential where pyrite, a major oxygen consumer in leaching, is not leached. This use of copper as the oxidant avoids some of the issues of effective heap aeration.

And a novel approach to chalcopyrite heap leaching has been proposed using glycine air leachant operating in an alkaline conditions. (Eksteen) At the optimum pH and oxidation potential, the leachate reaction with gangue minerals is limited, thus avoiding the issues of iron dissolution and re-precipitation which can inhibit heap permeability. Whilst air is the published oxidant for use with glycine, the opportunity to utilise other redox couples is apparent.

It is an object of this invention to provide a system that yields higher recoveries than achievable by normal heap leaching of low grade run of mine ore.

SUMMARY

This invention relates to a process for recovering value metals from sulphide ore, including steps of:
a) crushing ore in a primary crusher (14) to a size of about 40 cm and less, preferably 30 cm and less, typically about 20 cm and less, or 10 cm and less;
b) passing the crushed ore through one or more of the following pre-beneficiation processes:
    i. bulk sorting,
    ii. screening,
    iii. gravity separation,
    iv. magnetic separation,
    v. coarse flotation;
c) obtaining a waste stream from the pre-beneficiation process/es with a particle size greater than 100 μm;
d) stacking the waste stream in a heap (26) wherein the heap (26) has a particle size greater than 100 μm; and
e) subjecting the heap (26) to a heap leach.

Preferably, the waste stream is a combined waste stream (54) from two or more of said beneficiation processes and, at step b), the combined waste stream (56) has a particle size varying from greater than 100 μm and up to at least 5 mm; and, at step d), the heap (26) has a particle size varying from greater than 100 μm and up to at least 5 mm.

Preferably, in a step f), a product stream obtained from the pre-beneficiation process/es is subjected to further grinding and a fine flotation process (60), for example, the product stream may be ground to a particle p80 of less than 150 μm and subjected to a fine flotation process.

Preferably, at step b), the crushed ore is bulk sorted to provide a reject fraction (18) and a sorted higher grade ore stream (28). The reject fraction (18) is typically passed through a screen (20) and classified to provide:
    a primary waste stream (22) with a particle size typically above 2 mm, preferably above 5 mm and up to the maximum size generated by the crusher, for example the maximum particle size may be up to 15 mm, typically up to 10 mm; and
    an undersize fraction (24) with a particle size typically less than 10 mm, preferably less than 5 mm.

The sorted higher grade ore stream (28) is typically subjected to crushing and to further pre-beneficiation, using one or more of:
    screening;
    gravity separation;
    magnetic separation; or
    coarse particle flotation;
    to provide a pre-beneficiation waste stream (38) with a size of greater than 1 to 1.5 mm which is combined with the primary waste stream (22) and stacked in the heap (26).

The undersize fraction (24) from the screen (20) is preferably combined with the sorted higher grade ore stream (28) and subjected to the crushing (30).

Preferably, the ore is crushed at (30) to a particle size of with a p80 of about 1 mm to 1.5 mm and passed through a screen with an aperture size of about 1 mm to 1.5 mm, to provide:
    a secondary waste stream (38) with a size of greater than 1 to 1.5 mm which is combined with the primary waste stream (22); and
    and a classified fraction (36) with a particle size of 1 mm to 1.5 mm and less which is subjected to coarse particle flotation or gravity separation or magnetic separation which produces a pre-beneficiation residue (52) with a particle size greater than 100 μm suited to heap leaching.

The classified fraction (36) is preferably subjected to further classification to split the crushed ore into:
    a first beneficiation fraction (44) with a particle size greater 100 μm up to around 0.5 mm suited to coarse particle flotation or gravity separation or magnetic separation to produce a disposable beneficiation tailings (48);
    a second beneficiation fraction (42) suited to coarse particle flotation or gravity separation or magnetic separation to produce the beneficiation residue (52) with a particle size greater than 100 μm suited to heap leaching; and
    a classified fraction (41) with a particle size less than 100 μm suited to conventional fine flotation process (60).

Beneficiation residue (52) from a coarser fraction of the split coarse flotation process (52) may be combined with the waste stream (22), whilst pre-beneficiation tailings (48) from a finer fraction of the split coarse flotation process (46) is stacked separately.

The process ore may contain:
Copper sulphides,
Lead, Zinc and Silver sulphides,
Precious metal sulphides including Platinum and Gold, or Nickel sulphides.

Due to the prior removal of fines, the heap (26) that is subjected to heap leaching contains particles with a size greater than 100 μm, and hence is free-draining. By "free-draining is meant sufficiently permeable to both leachate and if required air, to enable percolation leaching of the contained values, using the type of reagents described previously.

Depending on the mineral, this heap can be leached using the particular leachate suited to that mineral assemblage to be recovered. For example, a primary copper ore would probably be leached under either sulphuric acid conditions (Robertson), or acidic copper chloride (Rautenbach).

DETAILED DESCRIPTION

Figure 1:
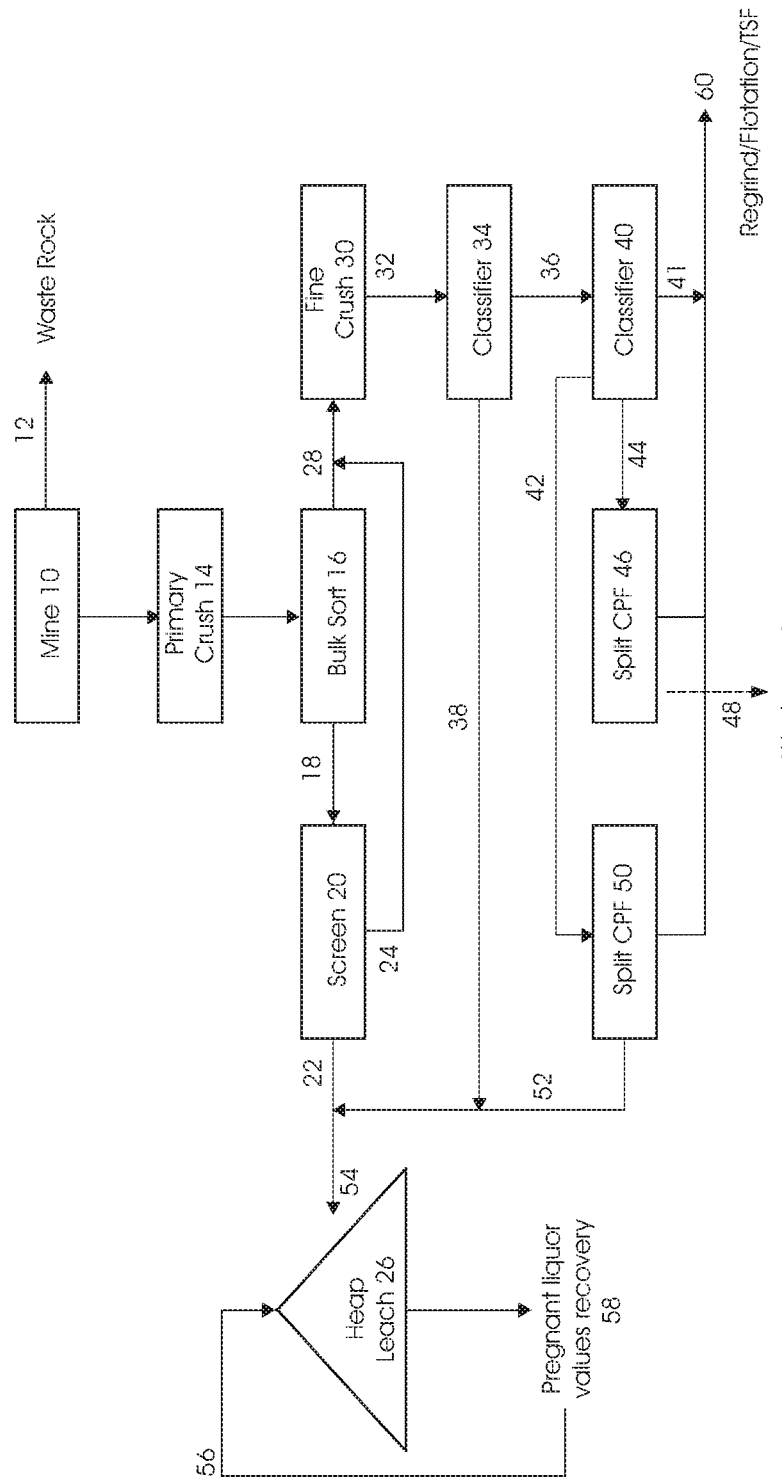
FIG. 1 is a flow diagram of a process of the present invention.

This application claims priority from U.S. Ser. No. 15/631,137, the content of which is incorporated herein by reference.

The invention is an integrated process, to utilise the pre-beneficiation techniques best suited to the characteristics of a particular orebody; and during the pre-beneficiation simultaneously creating a low grade stream that yields significantly higher recoveries than achievable by normal heap leaching of low grade run of mine ore.

It is the purpose of this invention to combine and integrate the known benefits of pre-beneficiation with those of heap leaching; to enhance the grade of ore to further processing, and simultaneously prepare a low grade ore which is significantly more amenable to extraction of values than the current methods of heap leaching. And in particular, to establish an integrated pre-beneficiation together with the newly proposed methods for heap leach of primary copper resources. Through this integration, the overall values recovery can be accelerated and increased, whilst reducing the tailings and water footprint of the mine, and also reducing the capital and operating costs of the assets.

Whilst the subsequent descriptions of the invention will illustrate the benefits for primary copper resources where the leachability of chalcopyrite opens up new possibilities, the underlying principles making up the invention are equally applicable to other metals such as PGMs, gold, nickel, zinc, and secondary copper, etc.

This integrated process can be configured such as to select a suitable particle size for each stage of pre-beneficiation to enable both an effective upgrade of ore that is progressing through to fine grinding and conventional flotation, with an appropriate size and grade of low grade stream that is more economically assigned to heap leaching.

By removal of the fines fraction into the concentrate product in the pre-beneficiation (as will naturally occur in the selected beneficiation processes) the permeability of the subsequent heap is enhanced, improving heap leach recoveries.

And by utilising the progressive size reduction required for the pre-beneficiation (as will naturally occur in optimising the selected pre-beneficiation processes) the rate of leaching of the values content in the heap is enhanced relative to heap leaching of low grade run-of-mine ore, and overall recoveries are also enhanced.

The heap leaching reagents and operating conditions are selected from those known in the art, and are tailored to enable efficient leaching of the different sizes of low grade streams generated by the pre-beneficiation, ranging from crushed rocks from an initial screening; through to coarse sand at sizes as low as 200 micron.

And by utilising heap leaching to recover the values in the discard fraction from pre-beneficiation, each stage of pre-beneficiation can economically reject more gangue, thus reducing the capital and operating costs of the fine milling and flotation processes.

The integrated system can be balanced to optimise cash margin for the particular ore to be processed, based on the relative recoveries from production through beneficiation and leaching.

Benefits of the Invention

The benefits of pre-beneficiation are well known to people skilled in the art:
Lower cost for the energy intensive fine comminution required to fully liberate the valuable mineral
Smaller comminution equipment and hence capital cost and footprint
Lower water consumption arising from dry storage of residue
Lower tailings generation arising from dry storage of residue.

The integration of pre-beneficiation with heap leaching that is the subject of this invention, further enables:
Early revenue from both the pre-beneficiation concentrate and the pre-beneficiation low grade residual stream, the latter achieved through combination with the heap leach processes
Overall extractions that yield a residue at a grade that does not economically justify reclaiming, thus eliminating a cost incurred in the typical grade engineering application of pre-beneficiation
Increased overall recovery of the metal values in the resource
Each pre-beneficiation reject fraction is heap leachable, with higher leach recoveries, relative to conventional heap leach
A reduction in the economic cut-off-grade for the resource
Ability to target a higher cut-off-grade for the ore directed to the more capital intense and high cost, finer beneficiation processes such as CPF, magnetic separation and flotation
Less tailings production
Less water consumption.

In summary, this integrated approach eliminates the impact of the grade vs recovery issues that have always constrained the application of pre-beneficiation:
Additional mining tonnage is no longer required for a similar level of metal production
Costs of storage and reclamation of the low grade stockpile are eliminated
Delay in revenue from stockpiling of low grade ore is avoided.

In addition to the economic mine optimisation, the intermediate concentrate grade generated by integrated pre-beneficiation and heap leach is much higher than that from RoM ore. Hence, the potential exists to pump the intermediate concentrate slurry to a distant processing plant.

This option for separate location enables potential benefits:
- Creation of satellite mines, to feed a central processing facility
- Location of the processing facility in a site ideally suited for tailings disposal
- Location of the processing facility in a site ideally suited for access to skilled labour.

Any particular mine, has its own particular balance of needs and constraints. The integrated pre-beneficiation and heap leaching enables adaption of the set-points to accommodate these needs without substantive loss in resource recovery.

FIG. 1 is a schematic diagram of one preferred embodiment of the current invention, as it might apply to a primary copper ore in location where water is a scarce resource.

Other embodiments include alternative pre-beneficiation configurations, by changing the number of the pre-beneficiation processes or substituting alternatives, and adjusting their operational set points in the comminution process, to meet the specific requirements of the mineral commodity and the mine location.

Blasted ore (10) is loaded and assigned using traditional grade control techniques to either waste (12) where the grade is insufficient to warrant processing, or to a crusher for further processing in a primary crusher (14).

After the crusher (14), a bulk sorting process (16) is used to separate the grade of ore (18) which delivers a higher cash margin through heap leaching than achievable through subsequent stages of grinding and beneficiation.

The split achievable by bulk sorting, to allocate material between heap leach and beneficiation, is improved relative to traditional grade control processes, due to the improved spatial precision of the bulk sorting system.

This low grade ore from bulk sorting (18) is screened or washed (20) to recover the undersize fraction (24) which is typically less than around 20 mm, and which has a higher grade than the feed, due to the differential fracture that occurs during blasting and primary crushing.

This screening enables allocation of the undersize containing the highest grade of ore (24) to further pre-beneficiation, and also improves the permeability of the remaining oversize ore (22), thus enhancing heap leach recovery.

The oversize (22) from screening (20) is stacked for heap leaching (26).

The high grade (28) fraction from bulk sorting (16) and the undersize (24) from screening (20) is passed through coarse comminution in a fine crushing device (30) such as a tertiary crusher, HPGR, VSI or ball mill, to reduce the ore size in a comminuted stream (32) to a p80 typically around 1-2 mm.

Stream (32) proceeds to classification (34). Classification, usually by screening, separates a finer and higher grade size fraction (36) suitable for further pre-beneficiation, and a coarser and slightly lower grade sand (38) which is suitable for heap leaching, either in the same or separate heaps (26) from ore stream (22).

This sand (38) is now at a size where permeability is still high, and heap leaching is faster than that for conventional heap leach and higher recoveries can be achieved, due to the additional fracturing of the rock during comminution.

The next step in beneficiation for most copper ores will be a combination of coarse flotation to remove further gangue to allow water recovery from much of the flotation residue. In this case, the classification (34) would probably remove material <1 mm, which would classified at around 100 micron to send the fines direct to conventional flotation (60).\

The coarser fraction may be further classified (40) to process the sub-fractions (42) and (44) through split coarse flotation units (46) and (50), where the different CPF operating conditions are selected to achieve the best grade recovery curves for each size fraction.

If the recovery in the upper size ranges of the split coarse flotation (50) did not produce a discard residue, this fraction of the residue (52), typically in the size range from 0.4 mm to 1 mm is combined at (54) with the oversize ore (22) and assigned for heap leach (22). The heap (22), is irrigated with leaching reagent (44) which percolates through the heap (22). Because the particles in the heap are greater than 100 µm in size, the heap is "free-draining", typically with a hydraulic conductivity higher than 1 cm/sec. A pregnant liquor (58) is obtained from the heap (26) and subjected to processes such as solvent extraction or ion exchange to recover the value from the leach liquor, followed by preparation of the liquor for recycle (56) and further leaching of the values.

The intermediate concentrates from the coarse flotation would proceed to regrind and conventional fine flotation process. In a conventional fine froth flotation process, particle sizes are typically less than 0.1 mm (100 µm).

The residue from coarse flotation (46/50) is a free draining sand, which can be hydraulically stacked for permanent disposal, and drained to recover the water.

The ultimate tailings generated from conventional flotation is a modest fraction of the initial mined ore, with the free draining residue streams (22), (38), (48) and (52), being sent to heap leach or directly to disposal, rather than ending up as tailings.

This modest quantity of flotation tails can then be stored in a purpose built tailings storage facility, or safely stored as a dry cap on exhausted leaching heaps, to prevent future acid mine drainage.

Heap Leach

In the case of gold, the heap leaching reagent is cyanide, whilst for secondary copper with sulphuric acid, as used in many operations around the world.

For a primary copper ore, the heap leach reagent would be selected from those currently under advanced development, such as described in Rautenbach, Robinson or Eksteen. The reduced average particle size in the heaps, will accelerate the leach rates from typically a 2 year turnaround for conventional heap leaching to around a 1 year cycle.

The invention has particular application in the heap leaching of primary copper (chalcopyrite) which has been uneconomic. The processes increase the effectiveness of combined beneficiation used alone, and increases the effectiveness of heap leaching on its own.

Bulk Sorting

In the bulk sorting step, the crushed ore from the primary crusher (14) to the fine crusher (25) on a conveyor. On the conveyor, the grade of the ore (or deleterious contaminants) is analysed, using techniques such as X-ray, neutron activation or magnetic resonance allowing diversion of the low grade stream from the main ore flow. The bulk sorter (16) may comprise a conveyor belt with a diverter mechanism controlled by a continuous analysis sensor (such a magnetic resonance or neutron activation or X-ray rapid scanning sensor), wherein the diverter mechanism diverts low grade zones of rock which do not meet a selected cut off grade (CoG) to the waste stream.

Magnetic Separation

Magnetic separation of weakly magnetic materials, using techniques such as wet high intensity magnetic separation, can be used as pre-beneficiation, typically operating in the particle size range from 0.2-1 mm. As such, it can form an effective alternative to coarse flotation.

Gravity Separation

Gravity separation using techniques such as DMS and reflux classification, can be used as a pre-beneficiation technique, providing sufficient density differential exists between the gangue and the valuable components. Such techniques again operate effectively in the size range from 0.2-1 mm.

Coarse Flotation

Coarse flotation may take place using a fit for purpose flotation machine such as the Eriez™ Hydrofloat. The Eriez Hydrofloat™, carries out the concentration process based on a combination of fluidization and flotation using fluidization water which has been aerated with micro-bubbles of air. The flotation is carried out using a suitable activator and collector concentrations and residence time, for the particular mineral to be floated. At this size, the ore is sufficiently ground to liberate most of the gangue and expose but not necessarily fully liberate the valuable mineral grains. The coarse flotation recoveries of partially exposed mineralisation is high, and the residual gangue forms a sand which does not warrant further comminution and conventional flotation.

Not all stages of pre-beneficiation will be applicable for all ores, and different configurations of the current invention are possible, as are different optimum sizes for application of the pre-beneficiation techniques. As examples:

If the ore is homogenous, bulk sorting may not be warranted

If the differential fracture and hence upgrade ratio on screening is low,
  screening fines from the material assigned to heap leach may be at a finer size, or not be warranted at all
  all material assigned to fine crushing may be comminuted to less than around 400 micron to utilise CPF producing a residue suited to direct disposal
  all material assigned to fine crushing may be comminuted to less than 0.8 mm, with coarse CPF used in conjunction with heap leach to recover the values If gravity separation or magnetic separation provide a more efficient upgrade than coarse flotation, then they may be utilised instead.

But whatever the optimum configuration of pre-beneficiation, comminution and classification for a particular ore, the essence of the current invention is maintained—pre-beneficiation processes to substantively reduce the amount of ore requiring fine grinding, integrated with heap leaching to retain high overall recoveries.

In summary,

The invention utilises multiple pre-beneficiation steps during the progressive reduction in particle size, to generate a series of discard streams, each of which is more economic to process by heap leaching than comminute further This discard material from each pre-beneficiation stage may be a higher grade than would normally be allocated to heap leach, due to the faster and more complete leaching The increasing grade and reducing tonnage of ore feed through beneficiation, requires a much lower capital and energy footprint per tonne of metal recovered.

The ultimate tailings formation is a small fraction of the original RoM and hence water losses are restricted, and tailings storage capacity can be eliminated or much reduced.

Example of Indicative Mass Splits and Recoveries

Figure 2:
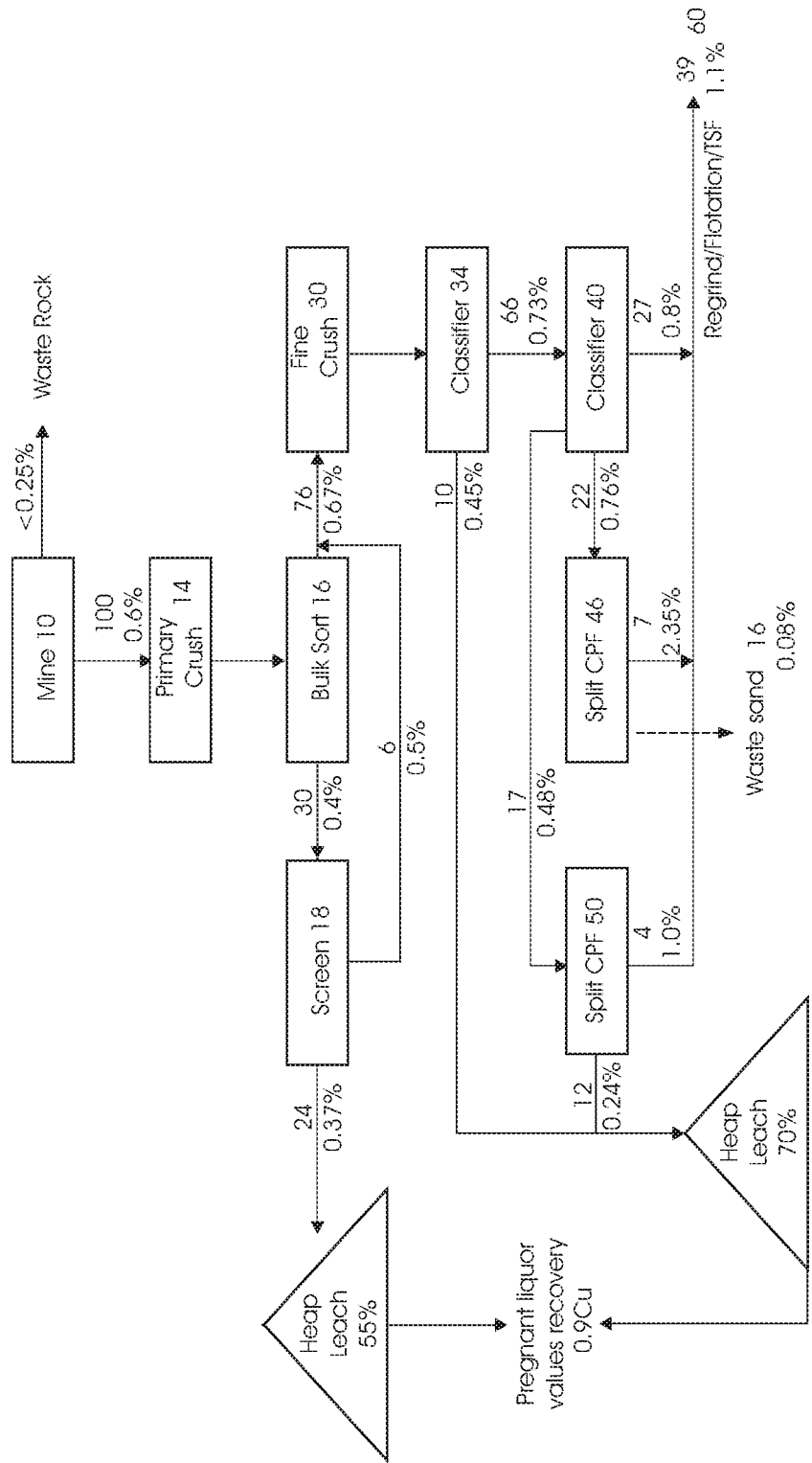
FIG. 2 is a flow diagram of an exemplary process of the present invention, indicating mass and grade splits.

An example of indicative mass and grade splits for a Chilean copper resource are illustrated in FIG. 2.

Assumptions of mass splits and copper recoveries in beneficiation are based on a geostatistical analysis of the spatial heterogeneity, and test-work to assess screening and coarse particle flotation. Assumptions on heap leach recoveries of chalcopyrite using the novel leachants are assumed from published data and unpublished information for sand leaching using the same reagents. Recoveries for conventional flotation and conventional heap leach are assumed from plant operational data.

The flowsheet configuration assumed for the mass split calculation, is the same embodiment of the invention as shown in FIG. 1.

As a comparison base to consider the current invention, for every 100 tonnes of ore recovered during mining using conventional grade control processes, 70 t is currently assigned to crushing/grinding/flotation @0.75% Cu and around 30% is assigned to heap leach @0.35% Cu. Average heap leach recovery of the primary copper ore is 30%, with only 10% of the chalcopyrite being recovered, and 50% recovery of the other copper minerals.

Operational recovery from 70 tonne fraction is by fine grinding and conventional flotation, and is 85%. Thus the overall global copper recovery from the ROM ore, for conventional processing by flotation of the higher grades and heap leaching of the lower grades of the orebody, is around 76%, with 70 tonnes of gangue in the form of tailings, consuming 45 tonnes of water.

The impact of the invention on mass and grade distributions, is shown in FIG. 2.

For the same 100 tonnes of ROM ore,
  Only around 40 tonnes reports to conventional flotation. (vs 70)
  The initial grind size is a p80 of 2 mm (vs. 0.25 mm)
  Global copper recovery is 78% (vs. 76%)

Thus a comparison of the invention with conventional processing, implies that the invention offers:
  Similar or improved global copper recovery from the resource
  Grinding capacity and associated power consumption is reduced by 40%,
  Tailings generation reduced to 50% of conventional This much improved processing footprint at the mine site and a high feed grade to conventional flotation such that the slurry can be readily pumped to a remote location, has significant impact on the capital cost of the overall facility.

For a brownfield retrofit, the benefits of the current invention can either be taken in terms of reduced costs, or mining faster to utilise the increased capacity of the assets.

Outline of Aspects of the Invention

1. A process in which pre-beneficiation is fully integrated with heap leaching, such that recoveries in pre-beneficiation are optimised together with sized pre-beneficiation residues that are suited to heap leaching with high recovery.

2. A process in which the split of ore between pre-beneficiation and heap leaching is enhanced using bulk sorting to optimise the overall economic efficiency for a particular mine.

3. A process in which the pre-beneficiation techniques are selected from the following options; screening, coarse flotation, magnetic separation and gravity separation.

4. A process in which the ore to be treated is suited to beneficiation by conventional flotation and contains copper, nickel, zinc, gold or PGMs.

5. A process in which the particle sizes selected for the pre-beneficiation steps are in the range from 50 mm to 0.2 mm, and preferably between 30 mm and 0.2 mm.

6. A process in which the pre-beneficiation is utilised to create a residual ore fraction of grade, size and silt content suited to enhanced recoveries during heap leach.

7. A process in which the ore contains significant chalcopyrite, and the leachant of the residue is either copper chloride or glycine.

8. A process in which the pre-beneficiation sizes are selected to reduce fine tailings formation and water consumption.

9. A process in which the limited quantity of tailings allows blending of these tailings with the material on the spent heap after leaching, thus avoiding the requirement for a permanent tailings storage facility.

10. A process which enables a much smaller mine footprint, by reducing the grinding requirements and potentially separating the mining and processing facilities by transporting the pre-beneficiation concentrate.

The invention claimed is:

1. A process for recovering value metals from sulphide ore, including the steps of:
   a) crushing ore in a primary crusher (14);
   b) subjecting the crushed ore (14) to a first pre-beneficiation step of bulk sorting to provide a reject fraction (18) and a sorted higher grade ore stream (28);
   c) subjecting the sorted higher grade ore stream (28) to crushing (30) and classification (34) to provide:
      secondary waste stream (38) with a particle size of greater than 1 to 1.5 mm; and
      a classified fraction (36) which is subjected to one or more of the following further pre-beneficiation steps:
         gravity separation,
         magnetic separation, or
         coarse particle flotation,
      to provide a further pre-beneficiation waste stream (52) with a particle size greater than 100 µm and a product stream (41);
   d) obtaining combined waste stream (54) from at least a portion of the reject fraction (18) from step b) and the secondary waste stream (38) and the further pre-beneficiation waste stream (52) from step c) with a particle size greater than 100 µm;
   e) stacking the combined stream (54) from the reject fraction (18), secondary waste stream (38) and pre-beneficiation process waste stream (52) waste streams in a heap or separate heaps (26) wherein the heap or heaps (26) has a particle size greater than 100 µm;
   f) subjecting the heap or heaps (26) to a heap leach; and
   g) subjecting the product stream (41) obtained from the further pre-beneficiation process to grinding and a fine flotation process (60).

2. The process claimed in claim 1, wherein at step d) the combined waste stream has a particle size varying from greater than 100 µm and up to at least 2 mm; and, at step e), the heap (26) has a particle size varying from greater than 100 µm and up to at least 2 mm.

3. The process claimed in claim 2, wherein at step b) the combined stream has a particle size varying from greater than 100 µm and up to at least 5 mm; and, at step e), the heap (26) has a particle size varying from greater than 100 µm and up to at least 5 mm.

4. The process claimed in claim 1, wherein the product stream (41) obtained from the pre-beneficiation process/es is ground to a particle p80 of less than 150 µm and subjected to the fine flotation process (60).

5. The process claimed in claim 1, wherein the reject fraction (18) is classified to provide two portions:
   a first portion comprising primary waste stream (22) with a particle size from 2 mm and up to and including 40 cm; and
   a second portion comprising an undersize fraction (24) with a particle size less than 10 mm.

6. The process claimed in claim 5, wherein the reject fraction (18) is classified to provide:
   the primary waste stream (22) with a particle size from 5 mm and up to and including 40 cm; and
   the undersize fraction (24) with a particle size less than 5 mm.

7. The process claimed in claim 6, wherein the primary waste stream (22) has a particle size from 5 mm and up to and including 30 cm.

8. The process claimed in claim 7, wherein the primary waste stream (22) has a particle size from 5 mm and up to and including 20 cm.

9. The process claimed in claim 8, wherein the primary waste stream (22) has a particle size from 5 mm and up to and including 10 cm.

10. The process claimed in claim 5, wherein the undersize fraction (24) is combined with the sorted higher grade ore stream (28) and subjected to the crushing (30).

11. The process claimed in claim 10, wherein the sorted higher grade stream (28) is crushed (30) to a particle size of with a p80 of about 1 mm to 1.5 mm and passed through a screen (34) with an aperture size of about 1 mm to 1.5 mm, to provide:
   the secondary waste stream (38) with a size of greater than 1 to 1.5 mm which is combined with the primary waste stream (22); and
   and the classified fraction (36) with a particle size of 1.5 mm and less which is subjected to the coarse particle flotation or the gravity separation or the magnetic separation which produces the further pre-beneficiation waste stream (52) with a particle size greater than 100 µm.

12. The process claimed in claim 11, wherein the classified fraction (36) is subjected to further classification (40) to split the crushed ore into:
   a first pre-beneficiation fraction (44) with a particle size greater 100 µm up to around 0.5 mm suited to the coarse particle flotation or the gravity separation or the magnetic separation to produce a disposable pre-beneficiation tailings (48);
   a second pre-beneficiation fraction (42) suited to the coarse particle flotation or the gravity separation or the magnetic separation to produce a pre-beneficiation waste (52) with a particle size greater than 100 µm suited to heap leaching; and
   the product stream (41) with a particle size less than 100 µm suited to the fine flotation (60).

13. The process claimed in claim 12, wherein the first fraction (44) is subjected to a first coarse floatation and the second fraction (42) is subjected to a second coarse floatation and the further pre-beneficiation waste stream (52) from said second coarse flotation is combined with the primary waste stream (22), whilst beneficiation tailings (48) from said second coarse flotation is stacked separately.

14. The process claimed in claim 1, wherein the ore contains:

Copper sulphide,
Lead, Zinc and Silver sulphides,
Precious metal sulphides including Platinum and Gold, or
Nickel sulphides.

* * * * *